United States Patent
Kobayashi et al.

[11] Patent Number: 5,924,956
[45] Date of Patent: Jul. 20, 1999

[54] CONTROL SYSTEM FOR AUTOMOBILE ENGINE

[75] Inventors: Hideki Kobayashi, Hiroshima; Hideki Kusunoki, Ehime, both of Japan

[73] Assignee: Mazda Motor Corporation, Hiroshima, Japan

[21] Appl. No.: 08/879,027

[22] Filed: Jun. 19, 1997

Related U.S. Application Data

[30] Foreign Application Priority Data

Jun. 20, 1996 [JP] Japan ................. 8-160024

[51] Int. Cl.⁶ ............................... F02M 25/08
[52] U.S. Cl. ........................... 477/111; 123/520
[58] Field of Search ................. 477/100, 111; 123/520

[56] References Cited

U.S. PATENT DOCUMENTS

| | | | |
|---|---|---|---|
| 4,381,753 | 5/1983 | Yuzawa et al. | 477/111 |
| 4,862,856 | 9/1989 | Yokoe et al. | 123/520 |
| 5,474,049 | 12/1995 | Nagaishi et al. | 123/520 |
| 5,651,351 | 7/1997 | Matsumoto et al. | 123/520 |
| 5,735,255 | 4/1998 | Farmer et al. | 123/520 |
| 5,765,541 | 6/1998 | Farmer et al. | 123/520 |

FOREIGN PATENT DOCUMENTS

| | | |
|---|---|---|
| 5-202815 | 8/1993 | Japan . |
| 6-323179 | 11/1994 | Japan . |

*Primary Examiner*—Dirk Wright
*Attorney, Agent, or Firm*—Sixbey, Friedman, Leedom and Ferguson; Donald R. Studebaker

[57] ABSTRACT

An idle speed control valve in a path bypassing an engine throttle valve is regulated in opening by feedback control and learning control in which a learned value depends upon a feedback control value to cause the engine to idle at a target speed of rotation. The determination of learned value is interrupted while a purge valve is remained open to purge fuel vapors into an air intake system for a specified period of time after detection of engine idling and resumed at a lapse of the specified period of time with interruption of on-idle fuel vapor purge. After the determination of learned value, the on-idle fuel vapor purge is resumed until an automatic transmission is shifted to, for instance, a drive range.

10 Claims, 4 Drawing Sheets

CONTROL SYSTEM FOR AUTOMOBILE
ENGINE

BACKGROUND OF THE INVENTION

1. Field of the Invention

This invention relates to an engine control system for an automotive vehicle engine which controls purging fuel vapors supplied from a fuel tank into an intake system of the engine while controlling the engine to rotate at a target speed of rotation during running idle.

2. Description of Related Art

Typically, engines, especially vehicle engines, are controlled to run idle at a specified target speed of rotation by feedback control and learning control. Utilization is made of a value learned based on a control value in the idle speed feedback control as a correction value to control the idle speed of rotation of the engine in the idle speed learning control. Specifically, in the idle speed learning control, the engine is controlled to run idle at a target speed of rotation by means of correcting and controlling, for example, the amount of intake air bypassing a throttle valve with the feedback control value and the learned value.

On the other hand, it is typical for the engine to purge fuel vapors into an air intake system of the engine. The fuel vapors are usually stored in a canister and drawn into a surge tank forming part of the air intake system where they are mixed with fuel for burning whenever predetermined purge conditions are satisfied. A purge valve is provided between the canister and the air intake system and controlled to open, permitting the fuel vapors to be drawn into the air intake system together with fresh air introduced into the canister.

While on-idle fuel vapor purge may be performed, various constraints are imposed on controlling the speed of rotation of the engine, which are always undesirable. For example, purging fuel vapors causes a change in engine speed of rotation. For this reason, determination of the learned value is suspended during the on-idle fuel vapor purge as taught by, for example, Japanese Unexamined Patent Publication No. 5-202815.

When the canister is filled and saturated with fuel vapors, there occurs an escape of fuel vapors from the canister into the atmosphere. In recent years, in order to prevent or reduce significantly an escape of fuel vapors into the atmosphere, a new technology has been proposed to purge fuel vapors into the air intake system from the canister as frequently as possible so that the canister has storage capacity sufficient to store fuel vapors drawn from the fuel tank. From this view point, there is a demand for a sufficiently long period of time for an on-idle fuel vapor purge. If, however, the on-idle fuel vapor purge is performed too frequently, missing the opportunity of determining the learned value is encountered in the idle speed learning control.

SUMMARY OF THE INVENTION

It is accordingly an object of the invention to provide an engine control system which provides properly the opportunity of determining a learned value in the idle speed learning control as well as the opportunity of purging fuel vapors even while the engine runs idle.

The foregoing object of the invention is accomplished by providing an engine control system for an engine which performs idle speed feedback control for causing the engine to run at a target idle speed of rotation by way of correctively controlling an intake air regulation valve with a control value corrected by a feedback correction value according to a deviation of an actual speed of rotation of the engine from the target idle speed of rotation and performs feedback learning control for learning a value by way of replacing a previous one of the feedback correction value with a latest one of the feedback correction value and correcting the control value with the learned value while the engine runs idler The engine control system includes purge control means for controlling opening of a purge valve disposed between a vapor storage canister and an intake manifold of the engine to purge fuel vapors into the intake manifold according to engine operating conditions for a specified period of time from a point of time at which idling of the engine is detected and causing the engine control system to perform determination of a learned value in the idle speed leaning control after a lapse of the specified period of time.

With the engine control system of the invention, at the beginning of engine idling, a learned value is determined in the idle speed learning control after the specified period of time of the on-idle fuel vapor purge. Even in cases where the engine repeatedly encounters idling and off-idling due to such traveling conditions that the vehicle repeats waiting for the traffic rights to change and restarting frequently, the engine control begins with the on-idle fuel vapor purge prior to the idle speed control, ensuring the sufficient opportunity of purging fuel vapors into the intake air system of the engine from the canister. The learned value is determined in the idle speed learning control after the specified period of time from detection of engine idling for the purpose of compensating the engine for differences among individual engines and changes due to aging and does not increase drastically, and hence it may be determined during a somewhat long duration of idling. The determination of a learned value is ensured in the idle speed learning control during engine idling while the opportunity of purging fuel vapors is ensured. Because purging fuel vapors is interrupted upon the determination of a learned value in the idle speed learning control, the learned value is accurate, which is always desirable for the engine to immediately develop the target idle speed of rotation.

The purge control means may causes the purge valve to remain open until the transmission means is placed in one of gears for travel after the determination of a learned value, i.e. until placed in one of travel ranges after the determination of a learned value if an automatic transmission is employed or until placed in one of gears while a clutch is connected after the determination of a learned value if a manual transmission is employed. Furthermore, The purge control means may permit the engine control system to perform the determination of a learned value in the idle speed learning control only once while the engine runs idle.

These variations greatly increase the opportunity of purging fuel vapors or provide a long duration of the period of time for purging fuel vapors, and make an accurate estimate of operation for starting the vehicle caused by the driver.

BRIEF DESCRIPTION OF THE DRAWINGS

The above and other objects and features of the present invention will be understood from the following description of a specific embodiment thereof when considering in conjunction with the accompanying drawings, in which.

DETAILED DESCRIPTION OF THE SPECIFIC EMBODIMENT

Figure 1:
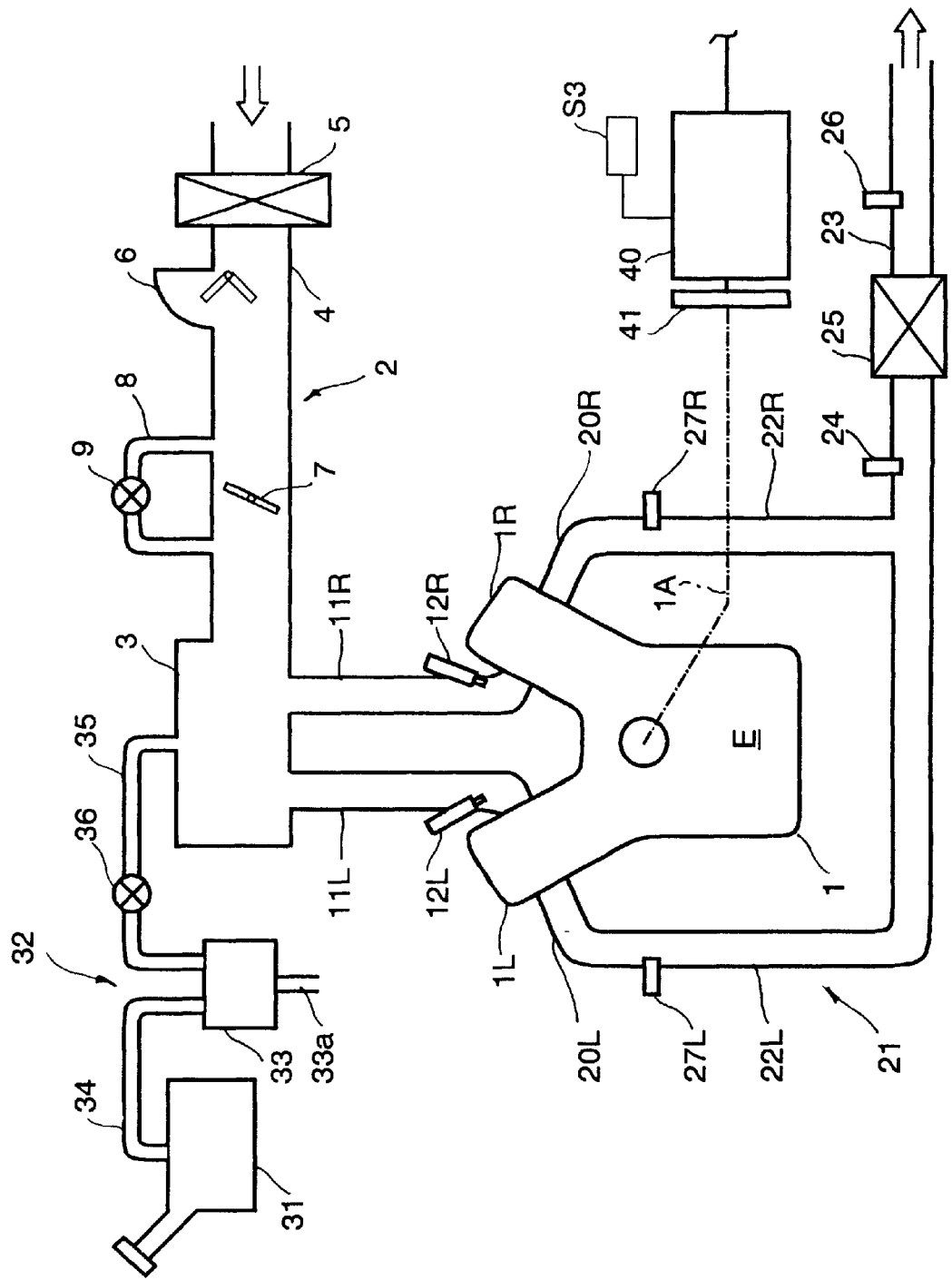
FIG. 1 is a schematic illustration of an engine and a fuel system which are controlled by an engine control system of the invention.

Referring to the drawings in detail, particularly to FIG. 1 which shows an engine 1, for example a six-cylinder V-type engine, including a fuel system controlled by an engine control system of the invention, an engine body E of the engine 1 comprises left and right cylinder banks 1L and 1R arranged in a V-formation with a predetermined relative angle. A row of three cylinders (not shown) are formed in the left cylinder bank 1L. Similarly, a row of three cylinders (not shown) are formed in the right cylinder bank 1R. The engine 1 has an air intake system 2 comprising a common intake pipe 4, a surge tank 3 and left and right discreet intake pipes 11L and 11R branching off from the surge tank 3. The cylinders in the left cylinder bank 1L are separately communicated with the surge tank 3 by way of the left discreet intake pipes 11L. Similarly, the cylinders in the right cylinder bank 1L are separately communicated with the surge tank 3 by way of the right discreet intake pipes 11R. The discreet intake pipes 11L and 11R are respectively provided with fuel injection valves 12L and 12R.

The common intake pipe 2 is provided with an air cleaner 5, an air flow sensor 6 and a throttle valve 7 arranged in this order from the upstream end toward the downstream end and has a bypass pipe 8 which allows intake air introduced into and flowing through the common intake pipe 2 to bypass the throttle valve 7. A continuously variable type of idle speed control (ISC) valve 9 is installed in the bypass pipe 7 to regulate the engine speed of rotation during running idle.

The engine 1 also has an exhaust system 21 comprising left and right exhaust pipes 22L and 22R. The left exhaust pipe 22L at its upstream end branches off into left discreet exhaust pipes 20L by way of which the cylinders in the left and right cylinder bank 1L are separately communicated with the left exhaust pipes 22L. Similarly, the right exhaust pipe 22R at its upstream end branches off into right discreet exhaust pipes 20R by way of which the cylinders in the right cylinder bank 1R are separately communicated with the right exhaust pipes 22R. These left and right exhaust pipes 22L and 22R at their downstream ends merge with a common exhaust pipe 23. The common exhaust pipe 23 is provided with an upstream oxygen sensor ($O_2$ sensor) 24, a catalytic converter for purifying exhaust gases, for example a three-way catalytic converter 25, and a downstream oxygen sensor ($O_2$ sensor) 26 arranged in this order from the upstream end toward the downstream end. The left exhaust pipe 22L is provided with an oxygen sensor ($O_2$ sensor) 27L located downstream from the left discreet intake pipes 20L. Similarly, the right exhaust pipe 22R is provided with an oxygen sensor ($O_2$ sensor) 27R located downstream from the right discreet intake pipes 20R. A fuel tank 31 is communicated with the surge tank 3 by way of a purge system 32 to introduce fuel vapor into the surge tank 3 from the fuel tank 31. The purge system 32 comprises a canister 33, a fuel vent pipe 34 by way of which the fuel tank 31 is communicated with the canister 33, a purge pipe 35 by way of which the surge tank 3 is communicated with the canister 33 having an air vent pipe 33a opening into the atmosphere, and a purge valve 36 installed in the purge pipe 35.

As is well known in the art, each of the oxygen sensors 24, 26, 27L and 27R provides output which is reversed in level according to changes in air-to-fuel ratio with respect to the stoichiometric mixture. The oxygen sensors 24 and 26 are used in combination to detect or diagnose functional deterioration of the exhaust gas purifying catalytic converter 25. In particular, a decision of functional deterioration of the exhaust gas purifying catalytic converter 25 is made based on a result of a comparison made between the numbers of reversals in level of output from the oxygen sensors 24 and 26 in a predetermined period of time during execution of air-to-fuel ratio feedback control in which an air-to-fuel mixture is controlled to bring the air-to-fuel ratio back to a proper level so as to maintain a stoichiometric air-fuel mixture. For example, the exhaust gas purifying catalytic converter 25 is decided to have functionally deteriorated if the ratio of the numbers of reversals is higher than a reference ratio or to function normally if the ratio of the numbers of reversals is lower than the reference ratio. On the other hand, the left oxygen sensor 27L is used in the air-to-fuel ratio feedback control to control fuel injection of the fuel injection valve 12L in each left discreet intake pipe 11L. Similarly, the right oxygen sensor 27R is used in the air-to-fuel ratio feedback control to control fuel injection of each fuel injection valve 12R in each right discreet intake pipe 11R. Diagnosis of the exhaust gas purifying catalytic converter 25 is executed while the air-to-fuel ratio feedback control is executed based on output from the oxygen sensor 24. Because the diagnosis of an exhaust gas purifying catalytic converter and the air-to-fuel ratio feedback control are well known in the automobile art and have no direct relation to the invention, their construction and operation will not be set out in more detail.

A transmission device 40 is connected between the engine 1 and a power train (not shown). The transmission device 40, which is of the manual type in this embodiment, is connected to an output shaft 1A of the engine 1 through a clutch 41. The transmission device 40 may be of the automatic type. As is well known, when an automatic transmission is employed, the clutch 41 is omitted.

During running idle, the speed of rotation of the engine 1 is controlled by learning and feedback control to reach a target idle speed of rotation through feedback control of the idle speed control valve 9. Also during running idle, fuel vapor purge control is executed to control the purge valve 36 in such a way as to introduce fresh air into the canister 33 through the air vent pipe 33a and draw it through charcoal in the canister 33. As the air passes the charcoal in the canister 33, it picks up the stored fuel vapors and draw them into the surge tank 3 forming part of the are intake system 2 where they are mixed with fuel for burning.

Figure 2:
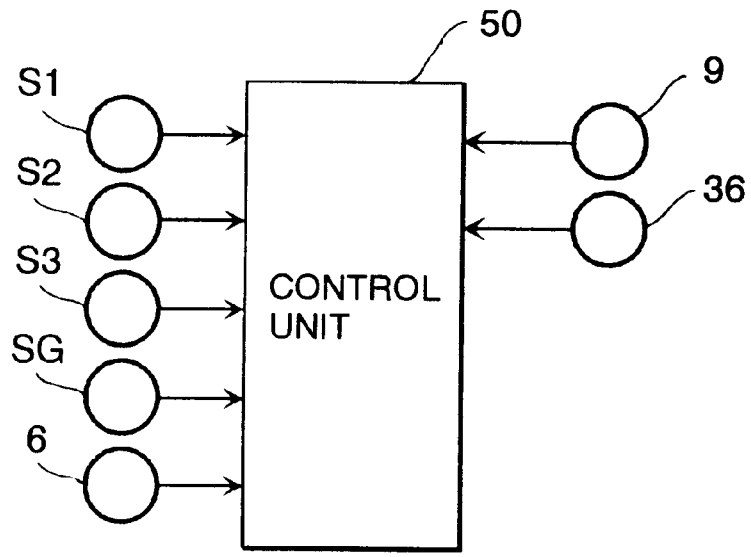
FIG. 2 is a block diagram showing an engine control system according to an embodiment of the invention.

FIG. 2 is a block diagram schematically showing a control system for the idle speed feedback control, the idle speed learning control and the fuel vapor purge control. The control system includes a control unit 50 comprising, for example, a microcomputer. The control unit 50 receives signals from various sensors and switches, including the air flow sensor 6, a engine speed sensor S1, an idle switch S2, and a transmission position sensor S3. Sensors inclusively labeled SG provide necessary data and signals necessary to perform control which will be described later. The control unit 50 provides control signals for the idle speed control valve 9 and the purge valve 36. The idle switch S2 provides an idle signal responding to release of an acceleration pedal (not shown). The transmission position sensor S3 provides a position signal indicating selected ranges if an automatic transmission is employed or selected gear if a manual transmission employed. All these sensors and switches are well known in various forms in the automobile art and may take any known forms.

Figure 3:
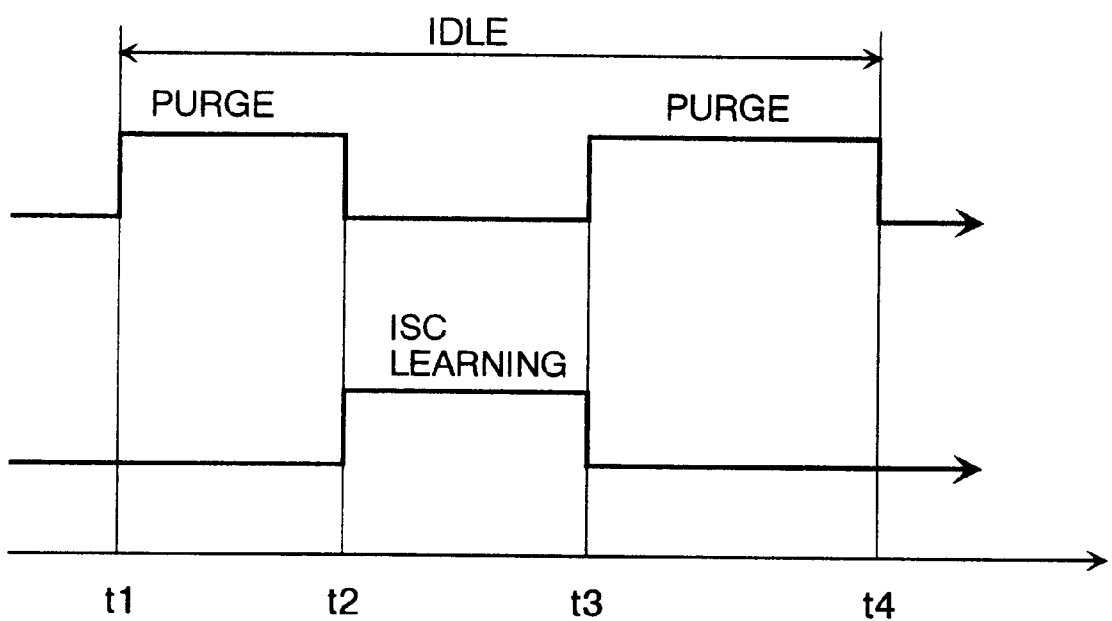
FIG. 3 is a time chart of control by the engine control system.

During running idle, the control unit 50 establishes times for execution of the fuel vapor purge control and determination of a learned value. Specifically, as shown in FIG. 3, when it is detected at a time t1 that the engine 1 is in an idle condition where the idle switch S2 provides an idle signal and the engine speed sensor S1 detects an engine speed of rotation lower than a threshold speed of rotation, the control unit 50 provides a control signal to open the purge valve 36 until a time t2. For the period of time between the times t1 and t2 (which is hereafter referred to as a purge time) which is previously fixed to, for example, 25 seconds, the control unit 50 keeps the purge valve 36 remain open to draw fuel vapors into the surge tank 3. At the time t2, the control unit 50 closes the purge valve 36 to interrupt fuel vapor purge and, immediately thereafter, makes computation of a leaning value necessary for the leaning control of idle speed control. The computation may be made once or otherwise repeated a specified times and, in spite of the number of computation, an approximate time permitted to learn the value is 25 to 30 seconds. Subsequently, after passage of time to a time t3, the control unit 50 resumes the fuel vapor purge. When the control unit 50 detects one of travel range positions of the automatic transmission, for example a position of drive (D) range, it interrupts the fuel vapor purge. During out of idle, off-idle fuel vapor purge control is timely executed complying with purge conditions.

Figure 4:
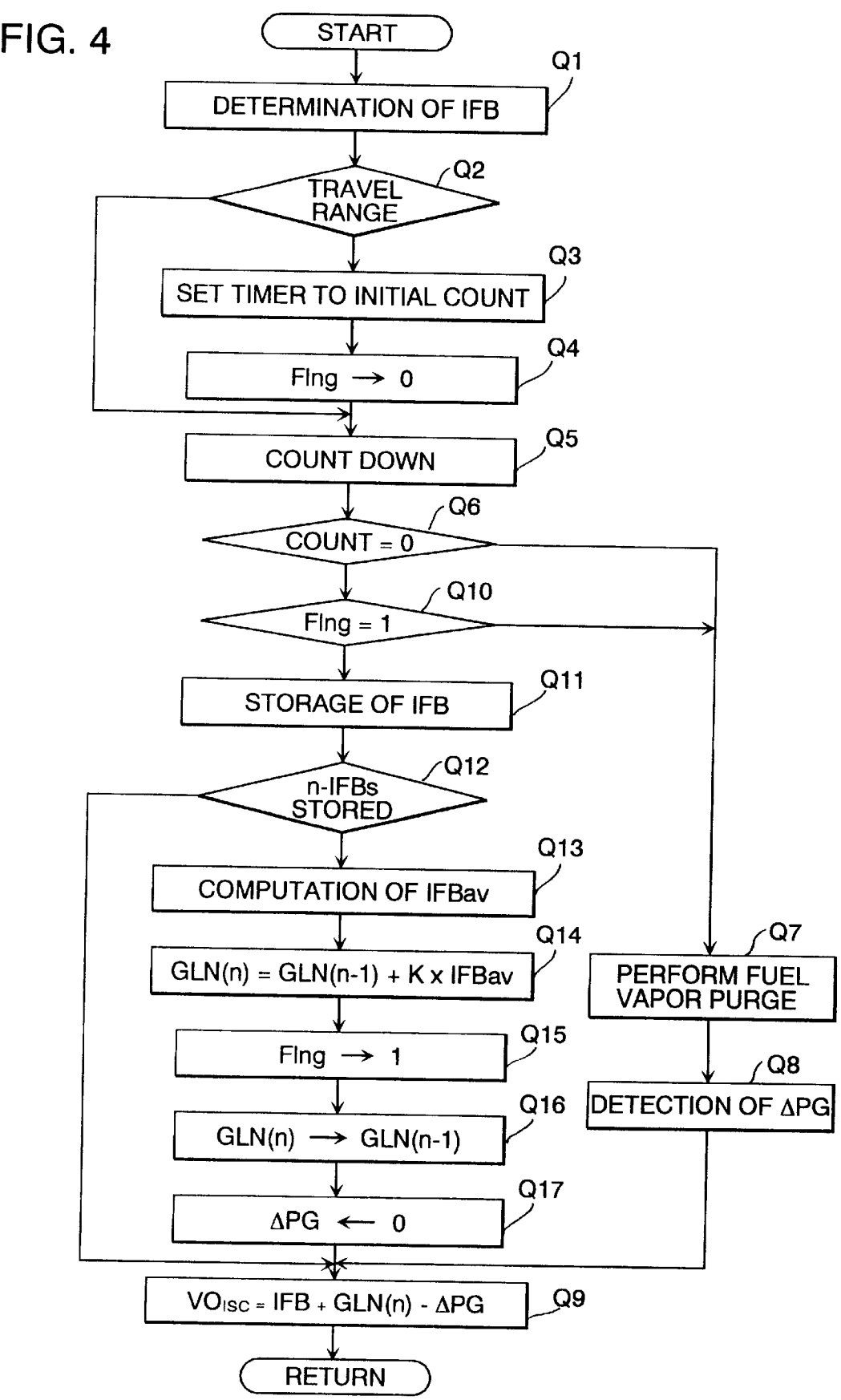
FIG. 4 is a flow chart illustrating an idle speed control sequence routine.
Figure 5:
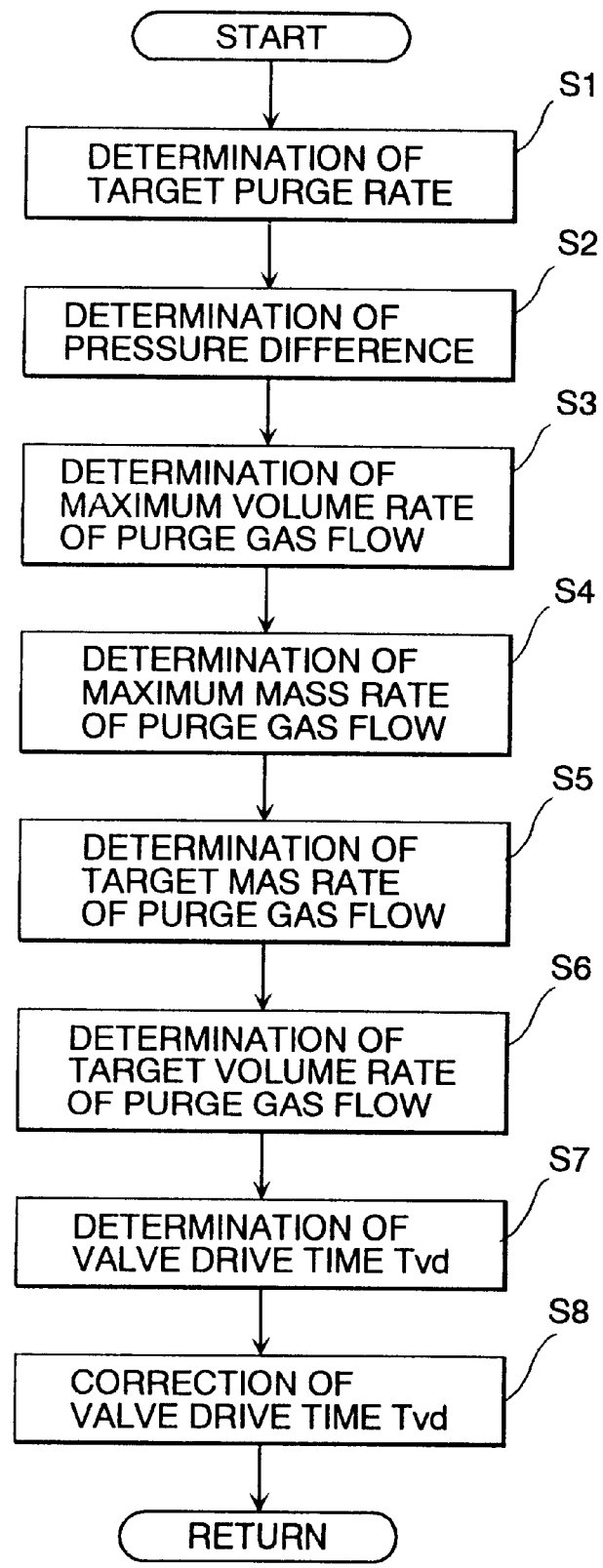
FIG. 5 is a flow chart illustrating an on-idle fuel vapor purge control sequence routine.

The operation of the engine control system is best understood by reviewing FIGS. 4 and 5 which are flow charts illustrating sequence routines of idle speed control and fuel vapor purge control for a microcomputer as the control unit 50, respectively. Referring to FIG. 4, which is a flow chart of a sequence routine of idle speed control on the engine 1 to which an automatic transmission is connected, the sequence routine commences on condition that the engine 1 runs idle. When flow chart logic commences and control proceeds directly to a function block at step Q1 where a correction value for idle speed feedback control (which is referred to as an idle speed correction value) IFB is determined from a deviation of an actual engine speed of rotation (an idle speed of rotation) from a target idle speed of rotation. Subsequently, a determination is made at step Q2 as to whether the automatic transmission is placed in any one of travel ranges. When the automatic transmission is in any one of travel ranges, after setting a timer to an initial count for the purge time (which is defined by the period of time between times t1 and t2 described in connection with FIG. 3) at step Q3, a learning flag Flng is set to a state of "0" at step Q4. In this instance, the learning flag Flng indicates the state that a learned value GLN has been determined or that determination of a learned value GLN is prohibited when it takes a state of "1" and the state that determination of a learned value GLN is allowed when it is down or takes a state of "0". When the automatic transmission is in ranges other than the travel ranges or after the learning flag Flng has set to the state of "0," the timer starts to count down a time from the initial count at step Q5. Subsequently, a determination is made at step Q6 as to whether the timer has counted down to 0 (zero). When the timer has not yet counted down to zero, the fuel vapor purge is performed at step Q7 and a change rate of fuel vapor purge (which is hereafter referred to as a purge change rate and will be described later) $\Delta PG$ is detected. Immediately after a decision of idling of the engine 1, the timer has not yet counted down, the idle speed corrective control sequence routine takes steps Q7 and Q8. At step Q9, a correction value relating to opening of the idle speed control valve 9 (which is referred to as a valve opening correction value VOISC) is determined based on the idle speed correction value IFB, the purge change rate $\Delta PG$, and a learned value GLN. In this instance, because the purge change amount $\Delta PG$ is considered as the rate of air escaping the throttle valve 7, the opening of the idle speed control valve 9 which determines the amount of air passing through the bypass pipe 8 is correctively reduced according to the change of purge amount $\Delta PG$.

At a lapse of the purge time, a determination is made at step Q10 as to whether the learning flag Flng is up or set to the state of "1". At the beginning of the idle speed corrective control, the learning flag Flng takes the state of "0" and, after storing the idle speed correction value IFB at step Q11, a determination is subsequently made at step Q12 as to whether a predetermined number (n) of idle speed correction values IFB have been stored. Before the storage of the predetermined number of idle speed correction values IFB, a valve opening correction value VOISC is determined at step Q9. In the case where the idle speed correction value IFB has been stored a predetermined number of times, i.e. where fuel vapor purge is not performed any more, an average of idle speed correction values IFBav is computed at step Q13.

Thereafter, at step Q14, a latest learned value $GLN_{(n)}$ is computed based on the average idle speed correction value IFBav. Specifically, the learned value $GLN_{(n)}$ is given by figure out the sum of the previous learned value $GLN_{(n-1)}$ and a latest average idle speed correction value IFBav multiplied by a specific coefficient K less than 1 (which may be ½ for example in this embodiment). Subsequently to the computation of the learned value GLN, resetting the learning flag Flng to the state of "1," replacement of the learned value GLN with the latest learned value $GLN_{(n)}$, and resetting the purge change rate $\Delta PG$ to 0 (zero) are performed in succession at steps Q15, Q16 and Q17, respectively. Finally, at step Q9, a valve opening correction value VOISC for the idle speed control valve 9 is determined. Opening of the idle speed control valve 9 is controlled with an effective valve opening value VO which is corrected according to the valve opening correction value VOISC and a basic valve opening value VO depending upon the temperature of engine coolant.

Referring to FIG. 5, which is a flow chart of a sequence routine of on-idle fuel vapor purge control in which the amount of fuel vapors is correctively controlled according to opening of the purge valve 36, the sequence routine commences and flow chart logic proceeds directly to a function block at S1 where a target purge rate is determined. This target purge rate is defined as a mass rate of purge gas relating to the mass rate of intake air flow measured by the air-flow sensor 6 and has an initial set of 0 (zero). In this instance, purge gas is regarded as atmosphere. The target purge rate is increasingly or decreasingly changed according to a feedback correction value for air-to-fuel ratio feedback control (a deviation from an air-to-fuel ratio of a stoichiometric air-fuel mixture). In order to purge as large amount of fuel vapors as possible, the target purge rate is established to be as large as possible within a range where it makes the feedback correction value for air-to-fuel ratio feedback control remain off the side significantly enriching an air-fuel mixture. Specifically, the target purge rate is decreased when the feedback correction value for air-to-fuel ratio feedback control encounters a deviation of more than 10% or increased when the feedback correction value for air-to-fuel ratio feedback control encounters a deviation of less than 5%, but otherwise it is maintained unchanged. In cases where the idle speed control valve 9 opens only in a range below a lower extremity of its dynamic range, the target purge rate is decreased.

Subsequently, an estimate is made in relation to a difference between pressure before and after the purge valve 36 at step S2. Specifically, the pressure difference is defined as a difference of intake air pressure from atmospheric pressure. In this instance, the intake air pressure is estimated from a map of intake air pressure with parameters regarding engine operating conditions such as an engine speed of rotation and the mass rate of intake air flow measured by the air flow sensor 6 and corrected according to the temperature of intake air. After the estimate of the intake air pressure difference, a maximum volume rate of purge gas flow ($cm^3$/min), which depends upon the intake air pressure difference for a full opening of the purge valve 36, is determined as an upper limit of purge gas quantity at step S3 and transformed into a maximum mass rate of purge gas flow (kg/s) at step S4. A target mass rate of purge gas flow (kg/s) is determined based on the target purge rate and the mass rate of intake air flow so as to be less than the maximum mass rate of purge gas flow (kg/s) at step S5 and subsequently transformed into a target volume rate of purge gas flow ($cm^3$/min) at step S6. In this instance, the target volume rate of purge gas flow ($cm^3$/min) is taken as the purge change rate ΔPG in the idle speed corrective control shown by the flow chart in FIG. 4.

At step S7, a valve drive time Tvd, i.e. a duty ratio (a ratio of open time relating to one cycle of time), of the purge valve 36 is determined taking the pressure difference determined at step S2 into consideration. The valve drive time Tvd is corrected as an effective duty ratio according to the voltage of battery and an ineffective time at the beginning of valve operation at step S8. The amount of fuel vapor to be purged may be set to predetermined target values stored in the form of a map.

In cases where a manual transmission is used in cooperation with the engine 1, the determination may be made as to whether a clutch between the engine and the manual transmission is connected while the manual transmission is placed in one of gear positions other than a neutral position in place of whether the automatic transmission is placed in any one of travel ranges.

It is to be understood that the present invention may be embodied with various changes, modifications and improvements, which may occur to those skilled in the art, without departing from the spirit and scope of the invention defined in the following claims.

What is claimed is:

1. An engine control system for controlling an engine equipped with transmission means, a canister operative to trap and storage fuel vapors produced in a fuel tank, a purge valve disposed between the vapor storage canister and an intake manifold of the engine and operative to purge fuel vapors into said intake manifold from the canister and an intake air regulation valve operative to regulate an amount of intake air introduced into an intake passage of the engine, said engine control system comprising:

idle speed controlling means for determining an intake air control value according to a feedback control value depending on a speed difference between a practical idle speed and a target idle speed with which the intake air regulation valve is controlled to regulate the amount of intake air so as to remove the speed difference and determining a learned feedback control value based on past and present said feedback control values with which said intake air control value is corrected;

operating condition monitoring means for monitoring operating conditions of the engine;

idle speed monitoring means for detecting that the engine runs idle; and purge controlling means for controlling said purge valve to open according to said operating conditions of the engine and, while said idle speed monitoring means detects that the engine runs idle, causing said purge valve to purge fuel vapors into the manifold from the canister for a specified period of time prior to determination of said learned feedback control value by said idle speed controlling means.

2. An engine control system as defined in claim 1, wherein said purge control means causes said purge valve to remain open until the transmission means is placed in one of gears for travel after said determination of said learned value.

3. An engine control system as defined in claim 1, wherein said transmission means comprises an automatic transmission and said purge control means causes said purge valve to remain open until said automatic transmission is placed in one of travel ranges after said determination of said learned value.

4. An engine control system as defined in claim 1, wherein said transmission means comprises a manual transmission and a clutch through which the engine is operationally connected to the manual transmission and said purge control means causes said purge valve to remain open until said manual transmission is placed in one of travel ranges while said clutch is connected after said determination of said learned value.

5. An engine control system as defined in claim 1, wherein said transmission means comprises an automatic transmission and said purge control means permits said engine control system to perform said determination of said learned value once while the engine runs idle.

6. An engine control system for controlling an engine equipped with a transmission system, an evaporation control system including a canister operative to trap and storage fuel vapors produced in a fuel tank and a purge valve disposed between the canister and an intake manifold of the engine and operative to purge fuel vapors into the intake manifold through the canister according to said operating conditions of the engine, and an intake air regulation valve operative to regulate an amount of intake air admitted into the intake manifold, said engine control system comprising:

an operating condition monitor operative to monitor operating conditions of the engine;

an idling monitor operative to detect that the engine runs idle; and a purge control unit for determining an intake air regulation vale according to a feedback control value depending upon a speed difference between a practical idle speed and a target idle speed with which the intake air regulation valve is controlled to regulate the amount of intake air so as to remove the speed difference, determining a learned feedback control value based on past and present said feedback control values with which said intake air control value is corrected and, while said idle speed monitor detects that the engine runs idle, causing said purge valve to purge fuel vapors into said intake manifold from the canister for a specified period of time prior to determination of said learned feedback control value by said idle speed control unit.

7. An engine control system as defined in claim 6, wherein said purge control unit causes said purge valve to remain open until the transmission is placed in one of gears for travel after said determination of said learned value.

8. An engine control system as defined in claim 6, wherein said transmission system comprises an automatic transmission and said purge control unit causes said purge valve to remain open until said automatic transmission is placed in one of travel ranges after said determination of said learned value.

9. An engine control system as defined in claim 6, wherein said transmission system comprises a manual transmission and a clutch through which the engine is operationally connected to said manual transmission and said purge control unit causes said purge vale to remain open until said manual transmission is placed in one of travel ranges while said clutch is connected after said determination of said learned value.

10. An engine control system as defined in claim 6, wherein said transmission means comprises an automatic transmission and said purge control unit permits said engine control system to perform said determination of said learned value once while the engine runs idle.

* * * * *